United States Patent [19]

Jeromin et al.

[11] Patent Number: 5,168,160

[45] Date of Patent: *Dec. 1, 1992

[54] METHOD AND APPARATUS FOR ACQUIRING AN ELECTRICAL SIGNAL REPRESENTING A RADIOGRAPHIC IMAGE

[75] Inventors: Lothar S. Jeromin, Newark, Del.; Denny L. Y. Lee, West Chester, Pa.

[73] Assignee: E. I. Du Pont de Nemours and Company, Wilmington, Del.

[*] Notice: The portion of the term of this patent subsequent to Nov. 24, 2009 has been disclaimed.

[21] Appl. No.: 723,315

[22] Filed: Jun. 28, 1991

[51] Int. Cl.⁵ .......................................... G01N 23/04
[52] U.S. Cl. ................................................ 250/327.2
[58] Field of Search ................ 250/327.2 R, 327.2 L; 378/99

[56] References Cited

U.S. PATENT DOCUMENTS

| | | | |
|---|---|---|---|
| 4,085,327 | 4/1978 | Swank et al. | 250/370 |
| 4,134,137 | 1/1979 | Jacobs et al. | 358/293 |
| 4,176,275 | 11/1979 | Korn et al. | 250/213 R |
| 4,268,750 | 5/1981 | Cowart | 250/315.1 |
| 4,446,365 | 5/1984 | Ong et al. | 250/213 R |
| 4,508,966 | 4/1985 | Oberschmid et al. | 250/327.2 |
| 4,521,808 | 6/1985 | Ong et al. | 358/111 |
| 4,535,468 | 8/1985 | Kempter | 378/31 |
| 4,539,591 | 9/1985 | Zermeno et al. | 358/335 |
| 4,554,453 | 11/1985 | Feigt et al. | 250/327.2 |
| 4,663,526 | 5/1987 | Kamieniecki | 250/315.3 |
| 4,818,857 | 4/1989 | Micheron | 250/213 R |
| 4,857,723 | 8/1989 | Modisette | 250/213 R |
| 4,961,209 | 10/1990 | Rowlands | 378/29 |
| 4,975,935 | 12/1990 | Hillen et al. | 378/28 |

Primary Examiner—Carolyn E. Fields

[57] ABSTRACT

A method and apparatus for capturing digital radiographic images. More particularly, the present invention relates to a method and associated apparatus for reading varying electrical charges representing a latent radiographic image stored in a unique microcapacitor matrix structure to obtain an electrical signal representing a radiogram. The microcapacitor matrix structure or element comprises a first, electrically conductive, backing layer, a second photoconductive layer, a third dielectric layer and a plurality of conductive microplates having dimensions coextensive with a minimum resolvable picture element. The method comprises (a) preventing actinic radiation from impinging on the element, (b) applying an electric potential difference between the plurality of microplates and the backing layer, (c) impinging imagewise modulated X-ray radiation for a first time period onto the element, (d) after the first time period, stopping the applying step, and (e) sequentially sensing a discrete electrical signal proportional to an electric charge associated with each of the microplates while exposing the microplates to actinic radiation.

18 Claims, 8 Drawing Sheets

METHOD AND APPARATUS FOR ACQUIRING AN ELECTRICAL SIGNAL REPRESENTING A RADIOGRAPHIC IMAGE

BACKGROUND OF THE INVENTION

1. Field of the Invention

The present invention relates to a method and apparatus for capturing digital radiographic images. More particularly, the present invention relates to a method and associated apparatus for reading varying electrical charges representing a latent radiographic image stored in a unique microcapacitor matrix structure to obtain an electrical signal representing a radiogram.

2. Description of Related Art

Traditional radiography employs a silver halide photosensitive film in a light tight cassette enclosure to capture a latent radiographic image, which is subsequently rendered visible following chemical development and fixing. Because silver halide film is not very sensitive to X-ray radiation, and large exposures are required to obtain an image, most applications use a combination of an intensifying screen incorporated in the cassette with the silver halide film to achieve lower exposures. Intensifying screens typically comprise a phosphor layer coated over a supporting substrate. As a result of the impingement of X-ray radiation, the phosphor layers emit photons. The emitted photons, i.e., the light intensity output, are proportional to the X-ray energy level absorbed by the phosphor particles in the screen. The film sensitivity is adjusted to match the color output of the phosphor. The phosphor layer has a greater thickness than typical film emulsion and increased X-ray stopping efficiency. The overall response of the combined film screen system is thus greatly enhanced. In practice, X-ray films are often coated on both sides with photosensitive emulsion and two screens are used to expose the film from both sides, further increasing the efficiency of the system and reducing the exposure time required to obtain a radiogram.

Radiograms have also been produced by capturing a latent radiographic image using a photoconductive plate in a xeroradiographic process. In this instance, a photoconductive plate sensitive to X-ray radiation comprising at least a photoconductive layer coated over a conductive backing layer is first charged by passing under a charging station typically comprising a corona wire. Positive or negative charge is uniformly deposited over the plate surface. The plate is next exposed to X-ray radiation. Depending on the intensity of the incident radiation, electron hole pairs generated by the X-ray radiation are separated by a field incident to the charge laid over the surface and as a result move along the field to recombine with the surface charge. After X-ray exposure, a latent image in the form of electrical charges of varying magnitude remain on the plate surface, representing a latent electrostatic radiogram. This latent image may then be rendered visible by toning and preferably transferring onto a receiving surface for better viewing.

Xeroradiography, a specific application of electroradiography offers high resolution and, because the photoconductive layer may be made fairly thick comparative to the phosphor screens, results in good X-ray conversion efficiency. It is, however, limited by the same limitations found in xerography in general, i.e., dynamic range and the complexity of processing equipment. The photoconductive plates must be handled in the absence of actinic radiation until after toning. Furthermore, the image is not in a format that can readily provide a digital output, which is highly desirable for electronic image processing, storage and display.

More recent developments include the use of an electrostatic image capture element to capture a latent X-ray image, the element comprising a photoconductive layer over an insulating layer on a conductive support, the photoconductive layer also covered by a dielectric layer, and the dielectric layer overcoated with a transparent electrode. A biasing voltage is applied between the transparent electrode and the conductive support to charge the element which is a large parallel plate capacitor. While the bias voltage is applied, the element is exposed to image wise modulated X-ray radiation. Following exposure, the bias is removed and a latent image is preserved as a charge distribution trapped in the dielectric layer. The problem with this element structure is that the latent image represented by local charge variations is a very small signal charge that must be extracted in the presence of random noise in the total capacitive charge in the full plate. Signal to noise ratio is typically poor.

In an effort to improve the signal to noise ratio, the transparent electrode is laid over the dielectric layer as a plurality of parallel narrow strips. In this manner the overall plate capacity is reduced and the signal extracted per picture element has a better signal to noise ratio. Methods to readout the latent image include inter alia, scanning the length of the strip electrode with a laser beam while reading the charge flow across the electrode and the conductive plate. While this element is a vast improvement over the continuous electrode structure covering the full plate, the signal to noise ratio is still a problem because of the relatively high dark current leakage under the electrode strip. Thus, an X-ray capture system based on this element structure still suffers in image quality.

SUMMARY OF THE INVENTION

It is an object of the present invention to provide an X-ray image capture element comprising a microcapacitor matrix structure that effectively retains charge while limiting the effects of dark current leakage during reading of the image and a method for reading out the image stored as a varying charge in the microcapacitor matrix structure to obtain directly an electrical signal representing a radiogram. Thus, in accordance with the present invention, there is provided a method for obtaining an electrical signal representing a radiogram, using an X-ray image capture element comprising:

a first, electrically conductive, backing layer;

a second, photoconductive layer responsive to both actinic and X-ray radiation extending substantially over said backing layer;

a third, dielectric layer substantially transparent to both actinic and X-ray radiation, the dielectric layer having a front surface and a back surface extending substantially over and in contact with said photoconductive layer; and a plurality of discrete conductive microplates substantially transparent to both actinic and X-ray radiation, said microplates on said front surface, each of said microplates having dimensions coextensive with a minimum resolvable picture element;

the method comprising:

(a) preventing actinic radiation from impinging on said element;
(b) applying an electric potential difference between said plurality of discrete conductive microplates and said backing layer;
(c) impinging imagewise modulated X-ray radiation for a first time period onto the element;
(d) after the first time period, stopping the applying step; and
(e) sequentially sensing a discrete electrical signal proportional to an electric charge associated with each of the microplates while exposing the microplates to actinic radiation.

Preferably, between steps (d) and (e), there is performed the additional step of exposing the element to uniform actinic radiation for a second time period.

Step (e) may be performed by contacting the microplates, one at a time, with a signal probe connected to a signal detector while exposing the microplates to actinic radiation; the detector is adapted to produce analog output signals proportional to the charge stored between each micro-capacitor comprising one of the microplates and the backing layer.

Step (e) may also be performed by accessing each of the microplates through means for switchably connecting the microplates to a common detector while exposing the microplates to actinic radiation.

Associated with the above method there is apparatus for acquiring an electrical signal representative of a radiogram, comprising:
(a) an element having:
   a first, electrically conductive, backing layer;
   a second, photoconductive layer responsive to both actinic and X-ray radiation extending substantially over said backing layer;
   a third, dielectric layer substantially transparent to both actinic and X-ray radiation, the dielectric layer having a front surface and a back surface extending substantially over and in contact with said photoconductive layer; and
   a plurality of discrete conductive microplates substantially transparent to both actinic and X-ray radiation, said microplates on said front surface, each of said microplates having dimensions coextensive with a minimum resolvable picture element;
(b) means for exposing the microplates to actinic radiation; and
(c) means for sequentially sensing a discrete electrical signal proportional to an electric charge associated with each of the microplates while exposing the microplates to actinic radiation.

Associated with this apparatus there is optional means for flooding the microplates with actinic radiation.

The sensing means may comprise an electrical charge detector which produces an analog signal output proportional to the charge stored in each microcapacitor comprised of one of the microplates and the backing layer, and means for contacting the microplates, one at a time, the contacting means connected to the detector.

Also an object of the present invention is to produce a radiogram using an X-ray image capture element comprising:
   a first, electrically conductive, backing layer;
   a second, photoconductive layer responsive to both actinic and X-ray radiation extending substantially over said backing layer;
   a third, dielectric layer substantially transparent to both actinic and X-ray radiation, the dielectric layer having a front surface and a back surface extending substantially over and in contact with said photoconductive layer; and a plurality of discrete conductive microplates substantially transparent to both actinic and X-ray radiation, said microplates on said front surface, each of said microplates having dimensions coextensive with a minimum resolvable picture element,
the method comprising:
(a) preventing actinic radiation from impinging on said element;
(b) applying an electric potential difference between said plurality of discrete conductive microplates and said backing layer;
(c) impinging imagewise modulated X-ray radiation for a first time period onto the element;
(d) after the first time period, stopping the applying step;
(e) sequentially sensing a discrete electrical signal proportional to an electric charge associated with each of the microplates while exposing the microplates to actinic radiation; and
(f) forming and displaying a radiograph from the sensed signals.

It is also within an object of the present invention to incorporate an additional step between steps (e) and (f) in the above method wherein the step is converting the sensed signals from analog to digital signals.

It is also an object of this invention to use an element which further comprises a charge barrier layer extending between the photoconductive layer and the backing layer. The barrier layer may behave as a blocking diode blocking the flow of charges in one direction. Furthermore, the element may be used in an enclosure which prevents actinic radiation from exposing the element, and which further includes:
   conductive contacting means, preferably resilient, for simultaneously contacting the plurality of microplates movable between a first position in contact with the microplates to a second position away from contact with the microplates; and
   electric power source means for applying an electric potential difference between said conductive contacting means and said backing layer.

DESCRIPTION OF THE PREFERRED EMBODIMENTS

Figure 1:
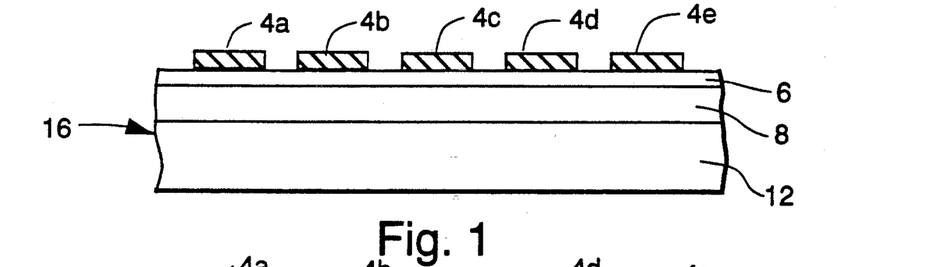
FIG. 1 shows a schematic cross sectional view of an X-ray capture element in accordance with the present invention.

Referring now to the drawings, in FIG. 1, an X-ray image capture element 16 has a first conductive backing layer 12. This conductive backing layer 12 is made of conductive material, and may be rigid or flexible, transparent or non transparent. Preferably it is a continuous layer made of a sufficiently thick and rigid conductive material to serve as support for the other layers that comprise the image capture element 16. In its simpler structure, there is coated over the conductive backing layer 12 a photoconductive layer 8 having a back surface in contact with the conductive backing layer, and a front surface. The photoconductive layer preferably exhibits very high dark resistivity.

The photoconductive layer 8 may comprise amorphous selenium, lead oxide, cadmium sulfide, mercuric iodide or any other such material, including organic materials such as photoconductive polymers preferably loaded with X-ray absorbing compounds, which exhibit photoconductivity.

In the context of the present invention, exhibiting photoconductivity means that upon exposure to actinic or X-ray radiation, the material exhibits reduced resistivity than in the absence of such exposure. The reduced resistivity is in reality the effect of electron hole pairs generated in the material by the incident radiation. Preferably, the change in apparent resistivity is proportional to the intensity of the incident radiation. By actinic radiation, again for purposes of describing the present invention, is meant ultraviolet (U.V.), infrared (I.R.) or visible, but excludes X-ray and gamma, radiation. The photoconductive layer 8 should be chosen of sufficient thickness to absorb the incident X-ray radiation, or a substantial portion thereof, to provide high efficiency in radiation detection. The specific type of material selected will further depend upon the desired charge retention time, and the desired simplicity of manufacture. Selenium is one preferred such material.

Over the front surface of photoconductive layer 8 there is applied a dielectric layer 6. The dielectric layer 6 must be transparent to both X-ray and actinic radiation and have sufficient thickness to prevent charge leakage. In the preferred embodiment of the present invention, the dielectric layer 6 should have a thickness greater than 100 Angstroms. Mylar ® with a thickness of 50 µm may be used for layer 6, although thinner layers are suitable.

Figure 2:
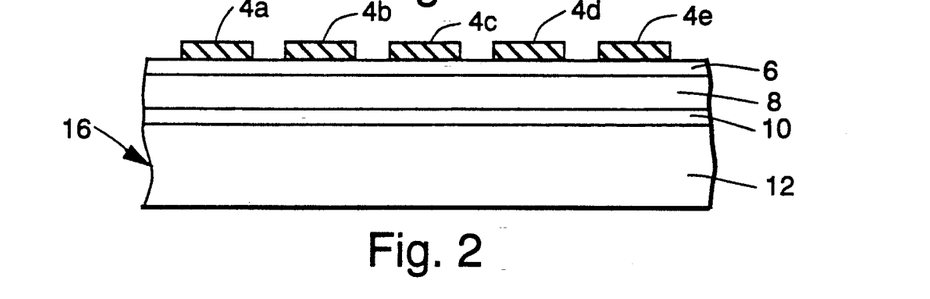
FIG. 2 shows a schematic cross sectional view of an alternate embodiment of an X-ray capture element in accordance with the present invention incorporating a charge barrier layer.
Figure 2A:
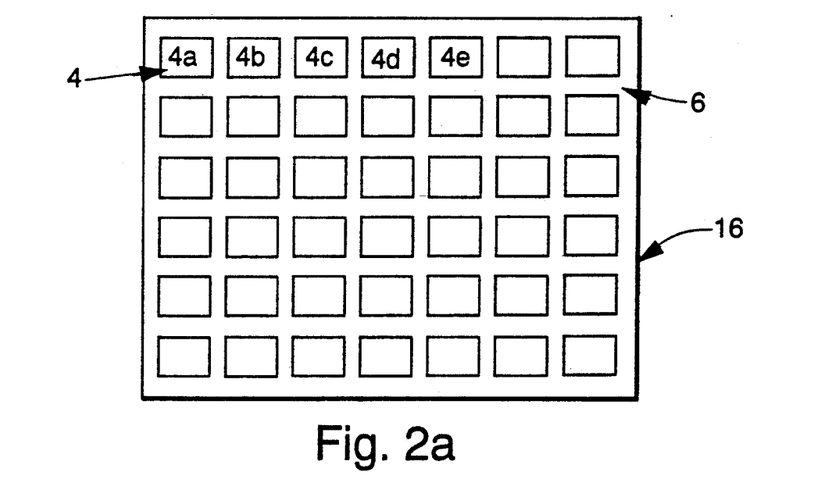
FIG. 2a is a top view of the embodiment of the X-ray capture element shown in FIG. 2.

As shown in FIGS. 1, 2 and 2a, over the dielectric layer 6 there is created a plurality of discrete minute conductive electrodes, 4a, 4b, 4c, etc., referred to herein as microplates. The dimensions of the microplates define a smallest picture element (PIXEL) resolvable by this element 16. The electrodes 4a, 4b, 4c, etc., are substantially transparent to both actinic and X-ray radiation. They are deposited on the dielectric layer 6, typically, though not necessarily, using vapor or chemical deposition techniques, and can be made of a very thin film of metal such as gold, silver, aluminum, copper, chromium, titanium, platinum and the like. Preferably the microplates 4a, 4b, 4c, etc., are made of transparent indium-tin oxide. The microplates 4a, 4b, 4c, etc., are normally deposited as a continuous layer which is then etched to produce a plurality of individual discrete microplates having dimensions coextensive with the smallest resolvable picture element. The microplates 4a, 4b, 4c, etc., may also be produced using laser ablation or photoetching. The technology to produce such microplates is well known in the art and is not further discussed herein. A good description of photomicrofabrication techniques is given in *Imaging Processing & Material*, chapter 18, entitled "Imaging for Microfabrication", P. 567 by J. M. Shaw of IBM Watson Research Center.

The combination of each one of the microplates 4a, 4b, 4c, etc., with the dielectric layer 6, the photoconductive layer 8, and the backing conductive layer 12 form two microcapacitors in series, a first microcapacitor being created between the microplate and the front surface of the photoconductive layer 8 and a second microcapacitor between that same surface and the conductive backing layer 12.

In an alternate and preferred structure, shown in FIG. 2, a charge barrier layer 10, is added on top of the conductive layer 12. Preferably, the base plate or layer 12 is made of an oxide forming metal such as aluminum, and the charge barrier layer 10 is provided by an aluminum oxide layer formed on the surface of base plate or layer 12. In this case, the subsequent coating thereon of a selenium photoconductive layer 8 produces a barrier layer 10 behaving as a blocking diode, inhibiting charge flow in one direction.

The charge barrier layer 10 may also be a simple insulating layer such as polyethylene terephthalate (Mylar ®), of dimensions comparable to the dielectric layer 6.

Dielectric layer 6, substantially transparent to both X-ray and actinic radiation and having sufficient thickness to prevent charge leakage, is placed over the front surface of photoconductive medium layer 8. Transparent, discrete, microplates or electrodes 4a, 4b, 4c, etc., are formed over the dielectric layer 6 as before.

The entire element 16 can be made by depositing successive layers of conductor, insulator, photoconductor, insulator, and conductor upon a substrate. Assembly may be accomplished by vapor deposition, vacuum deposition, lamination, sputtering or any other known technique useful to deposit even thickness films.

In the preferred embodiment, the conductive backing layer 12, the charge barrier layer 10, the photoconductive layer 8 and the dielectric layer 6, are all continuous layers. However, it is still within the contemplation of the present invention to manufacture an element for X-ray capture as herein above structured, in which not only the transparent electrode layer has been etched to produce a plurality of microplates 4a, 4b, 4c, etc., but one or more of the underlying layers 6, 8, 10 and 12 may also be etched with substantially the same pattern as the electrode layer, to form a plurality of discrete dielectric portions, photoconductive portions, barrier layer portions or even conductive portions lying below the microplates 4a, 4b, 4c, etc., in registration therewith. Furthermore, rather than etching a continuous layer to generate the microplates 4a, 4b, 4c, etc., direct deposition of the microplates 4a, 4b, 4c, etc., using masking techniques may be used, the method of manufacturing being one of choice depending on available resources and cost considerations, rather than an essential element or step of the present invention.

Figure 3:
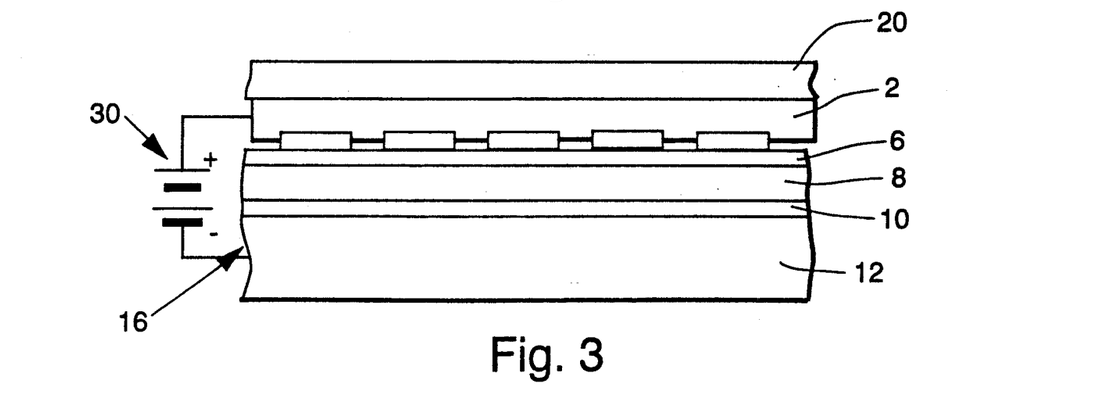
FIG. 3 shows a schematic cross sectional view of a device for capturing a latent X-ray image in accordance with the present invention.

The element 16 of FIG. 1 or 2 is preferably used in a device of the type shown in FIG. 3 to capture a latent X-ray image in a manner somewhat similar to the use of traditional silver halide film in a screen containing cassette. Such a device comprises in addition to an element for x-ray capture as described above, additional layers 2 and 20. Layer 2 is a conductive contacting layer which, in order to assure good electrical contact is preferably a resilient conductive layer, such as conductive foam, conductive velvet or conductive rubber. The use of the term resilient herein includes flexible layers. Layer 2 is movable between two positions, a first position in contact with the microplates 4a, 4b, 4c, etc., and a second position, not shown in the Figures, away from the microplates 4a, 4b, 4c, etc. This resilient layer 2 is preferably affixed onto a rigid supporting layer 20. Layers 20 and 2 are substantially transparent to X-ray radiation.

An electrical bias source 30 is connected to the backing electrode 12 and the conductive resilient layer 2 to apply a DC bias voltage across the element 16.

Figure 10:
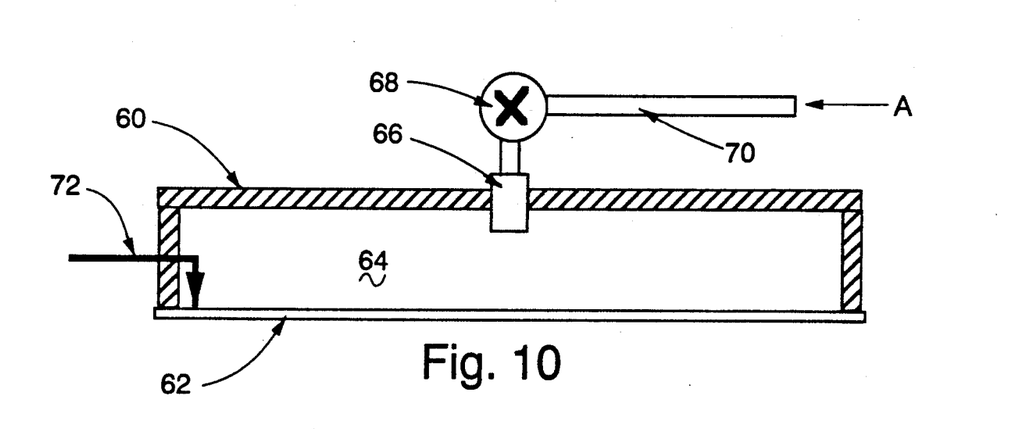
FIG. 10 is a schematic representation of a preferred arrangement of a resilient conductive contacting layer with pneumatic backing.

In a preferred embodiment, the conductive layer 2 comprises a conductive membrane 62 mounted on a framework which allows the application of pressure from a back side of the membrane 62 by injection of a fluid medium, such as air. FIG. 10 shows such a possible structure which may be incorporated as an integral part of a cassette 22 shown in FIG. 4 and discussed in detail below. The structure comprises a supporting enclosure 60 which is preferably airtight, and which supports on its lower end the flexible conductive membrane 62. The membrane may be conductive rubber. Contact means 72 are available to provide a path for connecting an external electrical bias source, i.e., source 30 which is not shown in FIG. 10, to the membrane 62. An orifice means 66 through a valve 68 allows to supply the fluid medium to chamber 64 formed by the airtight enclosure 60 and the flexible membrane 62. This structure results in a support for the membrane 62 that exhibits good and uniform flexibility and resiliency, assuring that each and everyone of the microplates 4a, 4b, 4c, etc., is contacted by the conductive layer 62.

In an alternate embodiment, the contacting layer 2 may comprise a layer of ionized gas contained in an enclosure covering the top surface of the element to provide electrical contact between the microplates 4a, 4b, 4c, etc., and the bias source 30. The ionization of the gas may be achieved using a two dimensional corona device which may be built within an enclosure which may also be built as an integral part of cassette 22.

Figure 4:
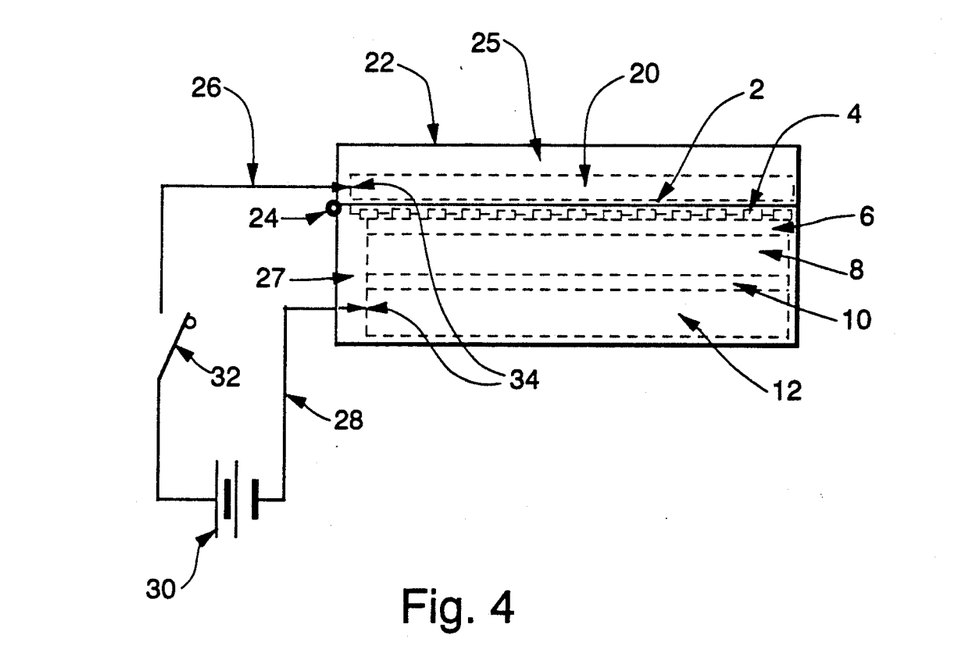
FIG. 4 depicts a schematic representation of the device of FIG. 3 in an enclosure to protect the device from exposure to actinic radiation.

In use, the device described may include a cassette enclosure to shield the element 16 from exposure to actinic radiation, much in the manner a cassette shields an X-ray film. FIG. 4 shows such an arrangement in which a cassette-like enclosure 22 is used. The cassette enclosure 22 is made of material which is opaque to ambient actinic radiation but transparent to X-rays. Since the ambient levels of gamma radiation are not usually high enough to present any exposure problems, it is not necessary that the material be opaque to gamma radiation. Similarly, in the absence of ambient IR radiation the enclosure need not be opaque thereto.

The enclosure 22 may include a hinge 24 hingedly connecting a top section 25 and a bottom section 27, allowing the cassette 22 to open and close at will. Within the top section 25, there is affixed supporting layer 20 and conductive contacting layer 2.

The cassette 22 further includes electrical connecting means 34 which permits one to connect power source 30 via wiring 26 and 28 to the conductive layer 2 and the conductive backing 12. Supporting layer 20 may also be conductive to facilitate the connection arrangement. A switch 32 is optionally provided to permit applying and stopping the applying of a bias voltage to the cassette 22.

Figure 5:
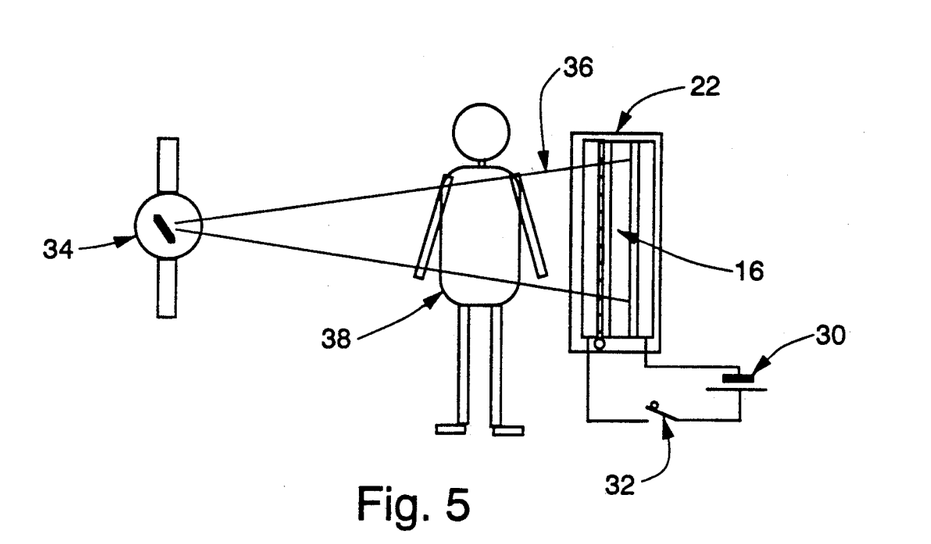
FIG. 5 shows in schematic representation an arrangement using the enclosure of FIG. 4 for capturing a latent X-ray image.

To obtain a latent radiographic image, the element 16 is placed in the cassette 22 as shown in FIG. 4, and the cassette 22 is placed in the path of information modulated X-ray radiation in a manner similar to the way a traditional cassette-photosensitive film combination is positioned. This arrangement is schematically depicted in FIG. 5 which shows a source of X-ray radiation 35, emitting a beam 36 of X-rays. A target 38, i.e., a patient in the case of medical diagnostic imaging, is placed in the X-ray beam path. The emerging radiation through the patient is intensity modulated because of the different degree of X-ray absorption in the target 38. The modulated X-ray radiation beam 36 is then intercepted by the cassette 22 containing element 16. X-rays penetrate the enclosure 22 and are eventually absorbed by the photoconductive layer 8 altering its apparent resistivity in proportion to the radiation intensity along the X-ray paths therethrough. Viewed in a different way, the X-rays generate a flow of electron hole pairs, of which the electrons are accumulated in the interface between the photoconductive layer 8 and the dielectric layer 6. Switch 32 is closed during the exposure step in synchronization therewith or prior thereto, applying a bias D.C. voltage to the element.

After a predetermined first time period the X-ray flux is interrupted and X-rays no longer impinge on the element 16. The application of the bias voltage is then, either simultaneously or soon thereafter removed from the element 16, such as, by opening the switch 32.

Following removal of the bias voltage from the element 16, the layer 2 is moved away from contact with element 16 and the cassette 22 may then be opened. In the alternative, the cassette 22 may be so arranged that moving layer 2 away from contact with element 16 results in the removal of the bias voltage in a manner similar to that obtained through the action of switch 32.

The element 16 can now be handled in the presence of actinic radiation without loss of the stored image information contained in it as a charge distribution in the microcapacitors in the dielectric layer 6. Preferably at this point, the element 16 is intentionally exposed to a large dose of actinic radiation, as by a flash exposure, to eliminate the charges stored in the photoconductive layer 8, by momentarily rendering such photoconductive layer 8 substantially conductive. The layer 8 behaves as substantially conductive, because the abundant illumination produces an ample supply of electron hole pairs, in effect neutralizing any charges stored in the photoconductive layer 8.

Figure 6:
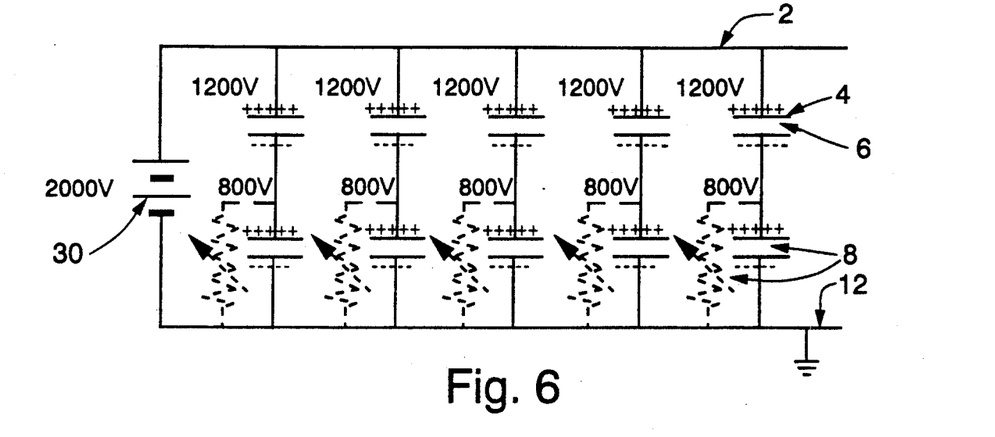
FIG. 6 represents an electrical equivalent of the element prior to exposure to x-ray radiation.

The combination of the dielectric and photoconductive layers 6 and 8 between the conductive microplates 4a, 4b, 4c, etc., and the backing layer 12, behave as two capacitors in series, one representing the dielectric, the other representing the photoconductor as shown in FIG. 6 which represents an equivalent electric circuit of the combination of the transparent electrode, the dielectric, the photoconductive and the backing conductive layers 4, 6, 8 and 12. In parallel with the photoconductive layer 8, there is shown a variable resistance in dotted lines representing the effect of the electron hole pair generation in the photoconductive layer 8.

When voltage supply 30 is connected across the element 16 as shown in FIG. 6, in the absence of actinic or X-ray radiation, the microcapacitors are all charged uniformly, the charge being a function of the capacitance of each capacitor. In the present case where all capacitors have the same area plates, the capacitance will depend on the plate separation and dielectric constant of the material between the plates. In the described structure this will result in two different voltages appearing across the capacitors, one in the capacitors representing the photoconductor layer 8, the other in the dielectric layer 6. If, for instance, the applied voltage difference from the bias source 30 is 2000 volts, it could be distributed across the two capacitors as 1200 volts across the dielectric layer 6 and 800 volts across the photoconductor layer 8.

Figure 7:
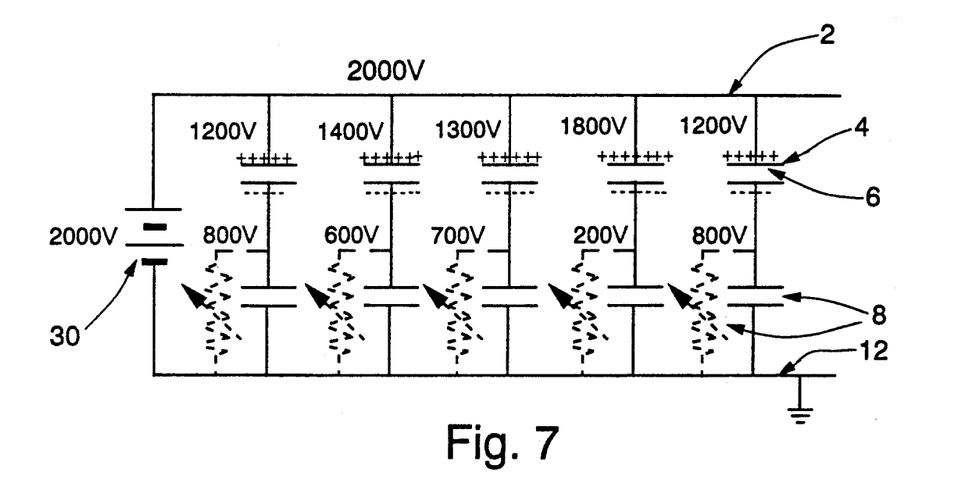
FIG. 7 represents an electrical equivalent of the element just after exposure to x-ray radiation.

When the element 16 is exposed to X-ray radiation, the overall voltage does not change, but because of the generation and movement of electron hole pairs, there is a new charge distribution in each of the microcapacitors, dependent on the radiation intensity incident on each of the microcapacitors, which produces a new voltage distribution between the two series connected microcapacitors. FIG. 7 shows schematically such a hypothetical consequential voltage redistribution.

When the X-ray exposure is terminated, the charges remain trapped in the microcapacitors. The optional charge barrier layer 10 in this case acts to assure that there is no charge leakage to equalize the charges over long periods of time.

Figure 8:
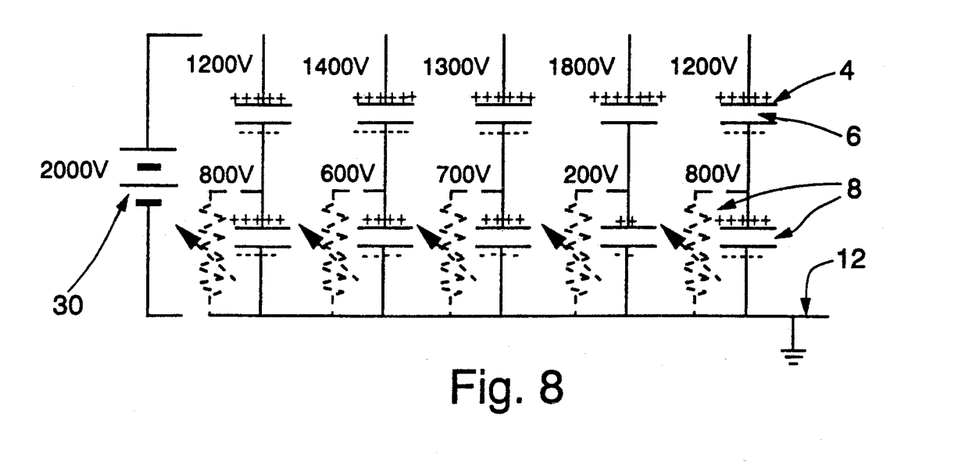
FIG. 8 represents an electrical equivalent of the element just after exposure to x-ray radiation and removal of the conductive, resilient contacting layer.

After termination of the X-ray exposure, the conductive contacting resilient layer 2 is moved to a position away from the microplates 4a, 4b, 4c, etc., breaking contact therewith and removing the source 30 from the element 16. FIG. 8 shows the voltage distribution at this point. The charges having nowhere to go and remain fixed as they were at the end of the X-ray exposure time period. At this time the voltage source 30 may be completely removed from contact with the element 16 or the cassette 22.

Figure 9:
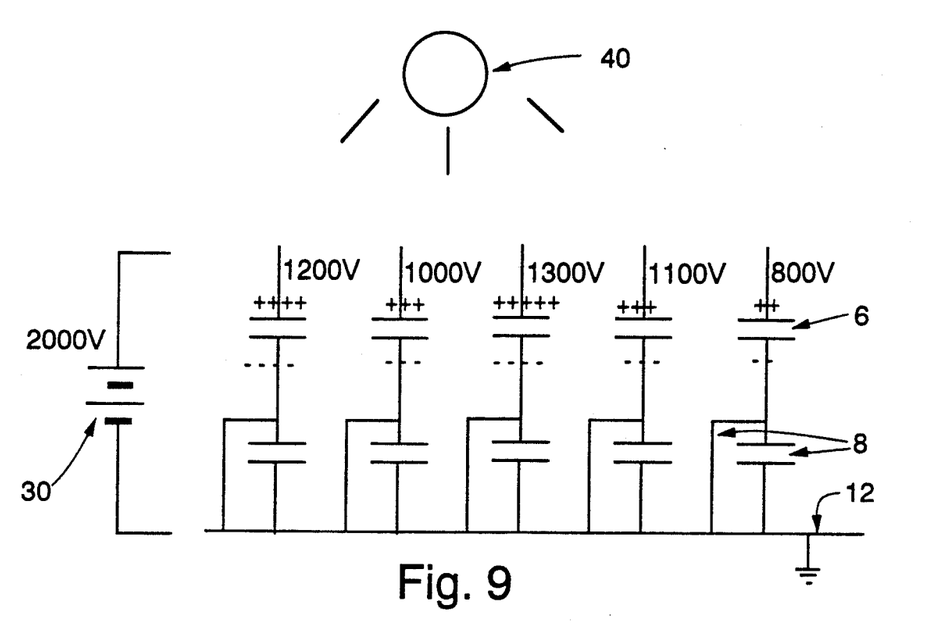
FIG. 9 represents an electrical equivalent of the element just after a uniform actinic exposure following exposure to x-ray radiation and removal of the bias source and of the conductive, resilient contacting layer.

The total voltage appearing across each capacitor pair is still 2000 volts. However, the charges in the dielectric portion of each capacitor are no longer uniform across the full surface of element 16, but vary, representing a latent radiographic image. In order to reduce the overall voltage, it is preferred at this stage to flash expose the element with actinic radiation, as shown in FIG. 9. The result of such flash exposure, which is done in the absence of a bias voltage and with resilient conductive layer 2 moved away from contact with the microplates 4a, 4b, etc., is to discharge each of the microcapacitors representing the photoconductive layer 8 in essence bringing one end of each of the dielectric microcapacitors to essentially ground potential. This has the advantage that on readout of the image, which in certain modes entails discharging sequentially each microcapacitor, the potential difference between a fully discharged microcapacitor and an adjacent undischarged as yet microcapacitor is less than it would be if the flash exposure had not occurred. This in turn results in a lesser chance of undesirable arcing between microcapacitors.

It is readily realized of course that the flash exposure, while preferably done using actinic radiation, can also be performed using additional, unmodulated X-ray radiation.

Figure 11:
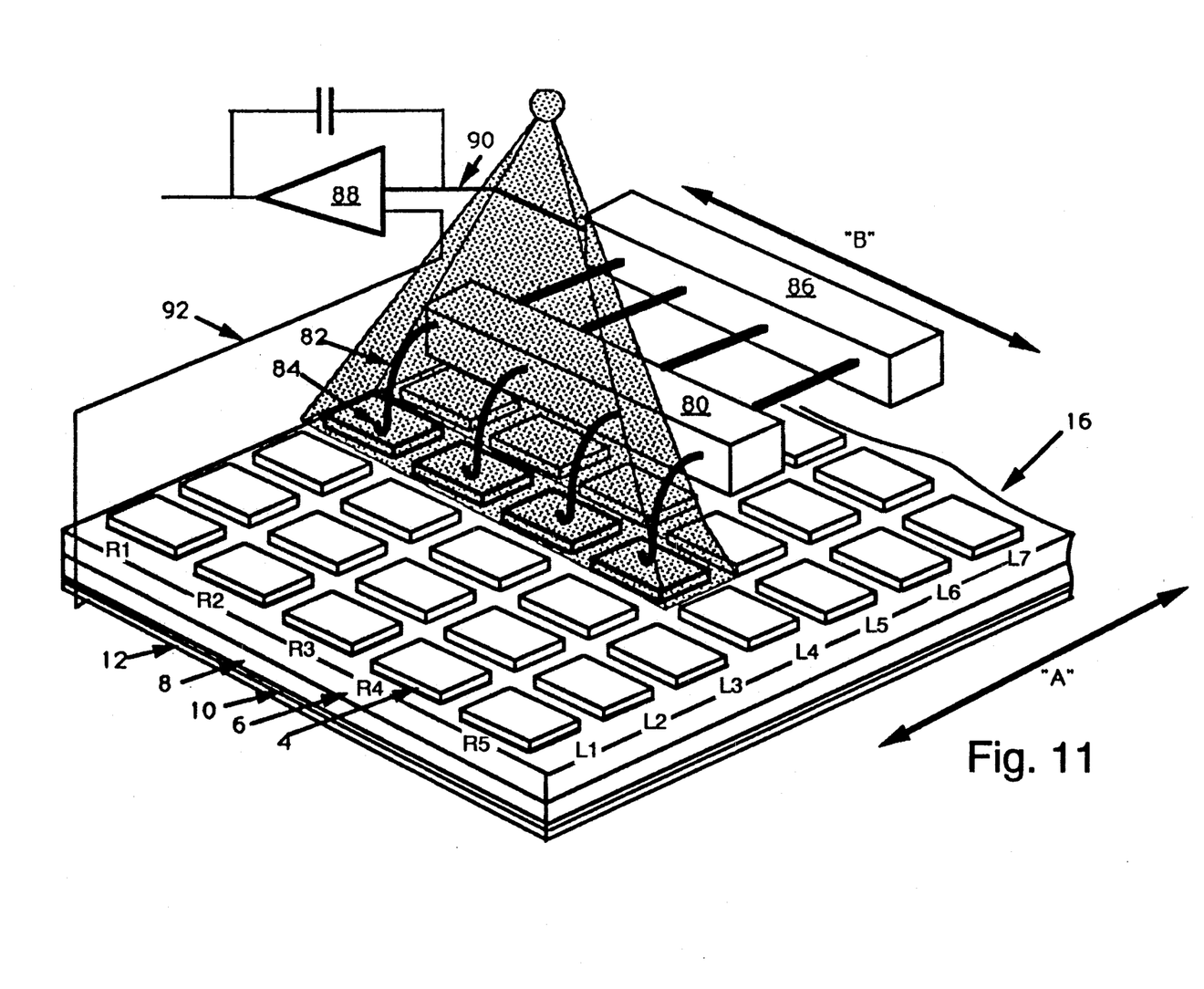
FIG. 11 is a pictorial representation of an arrangement for acquiring an electrical signal from an element in accordance with this invention.

FIG. 11 shows a first method for obtaining an electrical signal representative of the radiogram which resides as a charge distribution in the microcapacitors in element 16. This method relies on the use of a reading head 80 comprising at least one and preferably a plurality of wire probes 82 having a tip 84 sized to contact one microplate at a time, shaped so that it can glide without snagging over the microplates 4a, 4b, 4c, etc., as the probes 82 move along the direction indicated by arrows "A" and "B". Shown in FIG. 11 is a reading head 80 comprising four individual probes 82 extending in parallel. In cases such as shown where more than one probe 82 is used, a buffer/shift register 86 will be needed to temporarily hold the signal from each probe 82 and feed it sequentially to a detector 88 over line 90. Detector 88 is preferably a charge amplifier producing an output voltage proportional to the amount of charge detected in its input. The detector 88 is connected between the probe 82 (or the buffer/shift register 86, as discussed) and the conductive backing layer 12, via lead or line 92.

In addition to contacting each microplate or pixel with one of the probes 82, in order to obtain a signal, the pixel must be illuminated with actinic radiation. The effect of actinic radiation at this point is to again generate electron-hole pairs in the photoconductor 8 which allows current flow therethrough allowing the completion of the circuit through the amplifier 88 and the discharge of the microcapacitor into the amplifier input.

As hereinabove discussed, the surface of element 16 comprises a plurality of microplates 4a, 4b, 4c, etc. These microplates 4a, 4b, 4c, etc., are arranged in parallel rows R1, R2, R3, etc., and lines L1, L2, L3, etc., substantially orthogonal to each other. Accessing in sequence and in proper order all the microplates 4a, 4b, 4c, etc., may be accomplished by gliding the element 16 under the probes 82 in one direction, i.e., along arrow "A", and stepping the head 80 with the probes 82 in a direction orthogonal to that of the motion of the element 16, i.e., as shown by arrow "B" by an appropriate spacing to avoid reading any microplate rows twice or conversely skipping any microplate rows.

Figure 12:
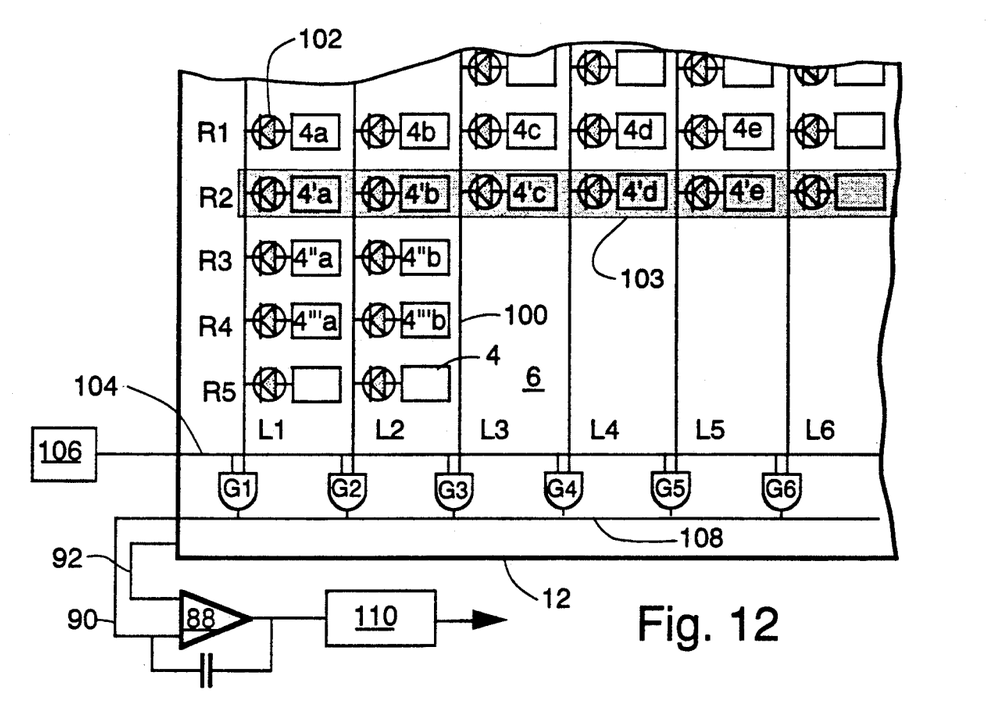
FIG. 12 is a schematic representation of an alternate arrangement for acquiring an electrical signal from an element in accordance with this invention.

FIG. 12 shows an alternate method for obtaining the signal stored in the microcapacitors in element 16. Element 16 in this instance has in addition to the microplates 4a, 4b, 4c, etc., produced on the surface of the dielectric layer 6, a pattern of conductive strips 100 extending between each row R1, R2, R3, etc., of the microplates, along lines L1, L2, L3, etc. Connecting each microplate along a line of microplates to the conductive strip 100 running along that line, is a photoswitch, such as a photoconductive diode 102. Thin film transistor technology is used in producing the array of switches or photodiodes 102 on the dielectric layer 6.

At the end of each line L1, L2, L3.. etc. of microplates 4a, 4b, 4c, etc., extends a row of semiconductor switches or gates G1, G2, G3, etc. The switches are sequentially addressable over line 104 controlled by a timing device 106. Each of strips 100 terminates at the input of one of the gates G1, G2, G3, etc. The output of each gate G1, G2, etc., is connected to an output strip 108. Strip 108 is in turn connected to detector 88 over lead 90. Lead 92 completes the circuit as before by connecting detector 88 also to the backing electrode 12.

In operation, means not shown in Figure for supplying illumination of a single row of microplates 4'a, 4"a, 4'''a, etc., and associated photodiodes 102 are actuated and illuminate each row of microplates sequentially, one row at a time. Such illuminating pattern is shown as shaded area 103 in FIG. 12. Timing control means 106 sequentially address each gate G1, G2, G3, etc., allowing the charges stored in the microcapacitors to flow in specified order to the detector 88 which produces an analog electrical signal, typically a voltage whose magnitude is proportional to such charges.

Figure 13:
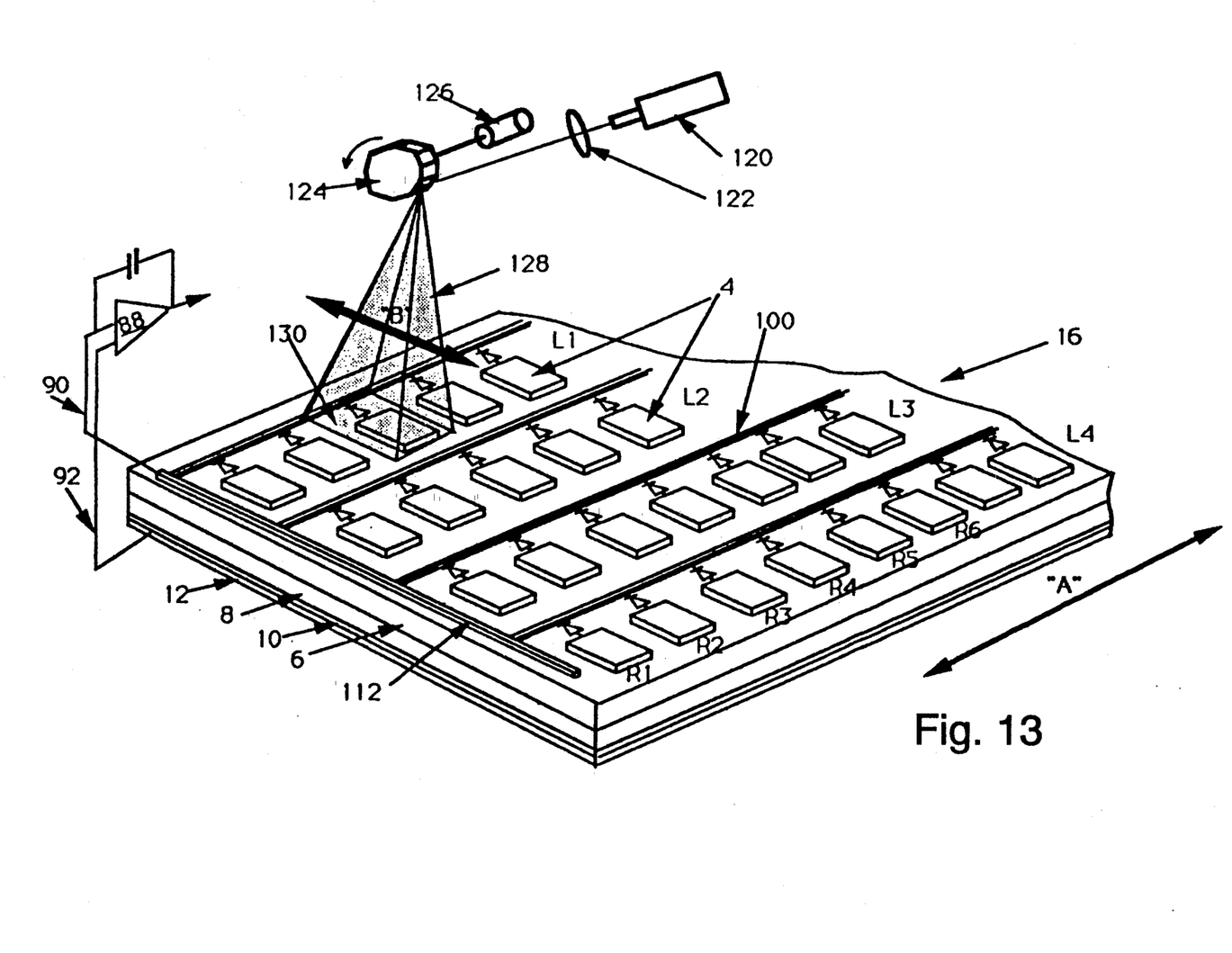
FIG. 13 is a pictorial representation of yet another embodiment of the present invention for acquiring an electrical signal from an element in accordance with this invention.
Figure 14:
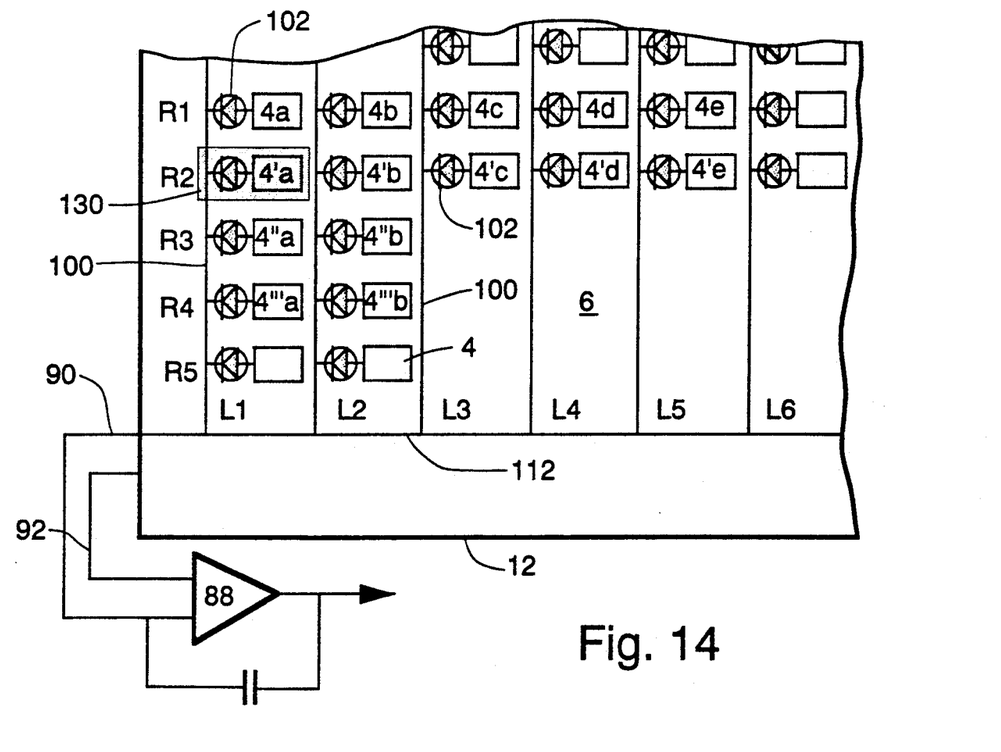
FIG. 14 is a schematic representation of a plan view of the embodiment depicted in FIG. 13, in which the light scanning arrangement is omitted to prevent cluttering of the drawing.

The signal stored in the microcapacitor may also be retrieved using the arrangement shown in FIGS. 13 and 14. FIG. 14 shows an element 16 which includes strips 100 extending along lines L1, L2, L3, etc., together with photodiodes 102 interconnecting microplates 4 to the strips 100. In this embodiment, along one end of element 16, runs another conductive strip 112, substantially orthogonal to the strips 100. Strips 100 terminate in contact with strip 104.

A detector 88, again comprising a charge amplifier, is connected between strip 112 and backing layer 12 over leads 90 and 92.

As better shown in FIG. 13, a laser scanner comprising a laser light source 120, a focussing system 122, a rotating polygon mirror 124 and an associated mirror drive 126 is used to direct a beam 128 of actinic radiation to illuminate an area 130 on the element 16 extending substantially over a microplate and photodiode combination.

In operation, as the polygon mirror 124 rotates, the illuminated area 130 moves along the direction of arrow "B", sequentially illuminating each photodiode 102 and associated microplate 4, sequentially discharging each microcapacitor through strips 100 and 112 into the input of detector 88, resulting in a varying analog voltage output at the detector output. Stepping means not shown in the figures are available to move the element 16 one row at a time along the direction shown by arrow "A", to effectuate complete scanning of all microplates 4 by the illuminated area 130.

In the preferred embodiment, preexposure of the element 16 to actinic radiation, as previously discussed, is desirable to prevent arcing between adjacent capacitors during the readout step. When such preexposure is used, care should be taken to select materials such that the photodiodes are not sensitive to the radiation used for the preexposure.

Figure 15:
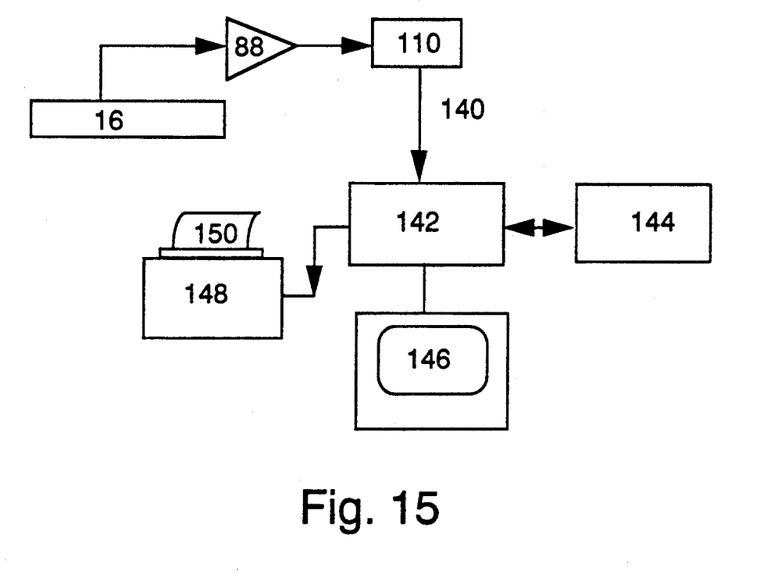
FIG. 15 is a block diagram of an arrangement for the capture and display of a radiogram in accordance with this invention.

The signal obtained from the detector 88 is preferably converted to a digital signal, in a digital to analog converter 110, as shown in FIG. 15. From the D to A converter 110 the signal is directed over line 140 to a computer 142. Computer 140 inter alia directs the signal to appropriate storage means which may be both a internal RAM memory or a long term archival memory 144 or both. In the process, the data representing the radiogram may undergo image processing, such as filtering, contrast enhancement and the like, and it may be displayed on a CRT 146 for immediate viewing or it may be used in a printer 148 to produce a hard copy 150.

The above description of the manner in which a radiogram is captured by the element and device in terms of a simple electrical equivalent is an oversimplification, given as an aid in understanding why such an element may capture an image in the form of trapped charges in a plurality of microcapacitors. A more accurate description would be one which takes into account the presence of the charge barrier layer and the parasitic capacitances present therein, in addition to the layers discussed herein above. The general description of the operation of the element in capturing a latent radiogram, of means for obtaining an electrical signal representative of such radiogram, and of the manner in which such electrical signal may be used in rendering such radiogram visible, as herein above set forth describes the present invention sufficiently to enable an understanding of the underlying principles.

The example and suggested systems illustrated and discussed in this specification are intended to teach those skilled in the art the best way known to the inventors to make and use their invention. Thus, the specific embodiments of this specification should be considered as illustrative rather than limiting the scope of the present invention. Many changes could be made by those skilled in the art to produce equivalent systems without departing from this invention.

What is claimed is:

1. A method for acquiring an electrical signal representing a radiogram, using an X-ray image capture element comprising:

a first, electrically conductive, backing layer;

a second, photoconductive layer responsive to both actinic and X-ray radiation extending substantially over said backing layer;

a third, dielectric layer substantially transparent to both actinic and X-ray radiation, the dielectric layer having a front surface and a back surface extending substantially over and in contact with said photoconductive layer; and a plurality of discrete conductive microplates substantially transparent to both actinic and X-ray radiation, said microplates on said front surface, each of said microplates having dimensions coextensive with a minimum resolvable picture element;

the method comprising:

(a) preventing actinic radiation from impinging on said element;

(b) applying an electric potential difference between said plurality of discrete conductive microplates and said backing layer;

(c) impinging imagewise modulated X-ray radiation for a first time period onto the element;

(d) after the first time period, stopping the applying step; and (e) sequentially sensing a discrete electrical signal proportional to an electric charge associated with each of the microplates while exposing the microplates to actinic radiation.

2. The method of claim 1, wherein the element further comprises a charge barrier layer extending between the electrical backing layer and the photoconductive layer.

3. The method of claim 1, further comprising between steps (d) and (e), exposing the element to uniform actinic radiation for a second time period.

4. The method of claim 1, 2 or 3, wherein step (e) is performed by contacting the microplates, one at a time, with a signal probe connected to at least one signal detector while exposing the microplates to actinic radiation.

5. The method of claim 1, 2 or 3, wherein the detector is adapted to produce analog output signals proportional to the charge stored between each microcapacitor comprising one of the microplates and the backing layer.

6. The method of claim 1, 2 or 3, wherein step (e) is performed by accessing each of the microplates through means for switchably connecting the microplates to a common detector while exposing the microplates to actinic radiation.

7. The method of claim 6, wherein the switching occurs using semiconductor switches.

8. The method of claim 6, wherein the switching occurs using photoelectric switches.

9. Apparatus for acquiring an electrical signal representative of a radiogram, comprising:
  (a) an element having:
    a first, electrically conductive, backing layer;
    a second, photoconductive layer responsive to both actinic and X-ray radiation extending substantially over said backing layer;
    a third, dielectric layer substantially transparent to both actinic and X-ray radiation, the dielectric layer having a front surface and a back surface extending substantially over and in contact with said photoconductive layer; and
    a plurality of discrete conductive microplates substantially transparent to both actinic and X-ray radiation, said microplates on said front surface, each of said microplates having dimensions coextensive with a minimum resolvable picture element;
  (b) means for exposing the microplates to actinic radiation; and
  (c) means for sequentially sensing a discrete electrical signal proportional to an electric charge associated with each of the microplates while exposing the microplates to actinic radiation.

10. The apparatus of claim 9, further comprising means for flooding the microplates with actinic radiation.

11. The apparatus of claim 9, wherein the sensing means comprises at least one detector and means for contacting the microplates, one at a time, the contacting means connected to the at least one detector.

12. The apparatus of claim 11, wherein the at least one detector is adapted to produce analog output signals proportional to the charge stored between each micro-capacitor comprising one of the microplates and the backing layer.

13. The apparatus of claim 9, wherein the sensing means comprises a detector and means for accessing each of the microplates through means for sequentially switching such microplates onto the detector.

14. The apparatus of claim 13, wherein the switching means comprises semiconductor switches.

15. The apparatus of claim 13, wherein the switching means comprises photoconductor switches.

16. A method for producing a radiogram using an X-ray image capture element comprising:
  a first, electrically conductive, backing layer;
  a second, photoconductive layer responsive to both actinic and X-ray radiation extending substantially over said backing layer;
  a third, dielectric layer substantially transparent to both actinic and X-ray radiation, the dielectric layer having a front surface and a back surface extending substantially over and in contact with said photoconductive layer; and
  a plurality of discrete conductive microplates substantially transparent to both actinic and X-ray radiation, said microplates on said front surface, each of said microplates having dimensions coextensive with a minimum resolvable picture element,
the method comprising:
  preventing actinic radiation from impinging on said element;
  (b) applying an electric potential difference between said plurality of discrete conductive microplates and said backing layer;
  (c) impinging imagewise modulated X-ray radiation for a first time period onto the element;
  (d) after the first time period, stopping the applying step;
  (e) sequentially sensing a discrete electrical signal proportional to an electric charge associated with each of the microplates while exposing the microplates to actinic radiation; and
  (f) forming and displaying a radiograph from the sensed signals.

17. The method of claim 16, further comprising: prior to step (f), converting the sensed signals from analog to digital signals.

18. The method of claim 16, further comprising: storing the sensed signals in a memory.

* * * * *